(12) United States Patent
Wang et al.

(10) Patent No.: US 11,989,263 B2
(45) Date of Patent: May 21, 2024

(54) METHOD, ELECTRONIC DEVICE, AND COMPUTER PROGRAM PRODUCT FOR DATA PROCESSING

(71) Applicant: EMC IP Holding Company LLC, Hopkinton, MA (US)

(72) Inventors: Zijia Wang, WeiFang (CN); Jiacheng Ni, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 425 days.

(21) Appl. No.: 17/541,360

(22) Filed: Dec. 3, 2021

(65) Prior Publication Data
US 2023/0129929 A1   Apr. 27, 2023

(30) Foreign Application Priority Data
Oct. 22, 2021   (CN) .......................... 202111235817.3

(51) Int. Cl.
*G06N 20/00*   (2019.01)
*G06F 18/21*   (2023.01)
*G06F 18/214*   (2023.01)

(52) U.S. Cl.
CPC ...... *G06F 18/2148* (2023.01); *G06F 18/2178* (2023.01); *G06N 20/00* (2019.01)

(58) Field of Classification Search
None
See application file for complete search history.

(56) References Cited

U.S. PATENT DOCUMENTS

| 2014/0156411 | A1* | 6/2014 | Murgai | G06Q 30/0269 705/14.66 |
| 2023/0103817 | A1* | 4/2023 | Ferreira | G06F 9/44505 706/12 |
| 2023/0122139 | A1* | 4/2023 | Ferreira | G06N 3/098 706/12 |
| 2023/0237344 | A1* | 7/2023 | Wang | G06N 5/022 706/12 |
| 2024/0062057 | A1* | 2/2024 | Jandial | G06N 3/08 |

OTHER PUBLICATIONS

T. Wang et al., "Dataset Distillation," arXiv:1811.10959v3, Feb. 24, 2020, 14 pages.

(Continued)

*Primary Examiner* — Dov Popovici
(74) *Attorney, Agent, or Firm* — Ryan, Mason & Lewis, LLP

(57) ABSTRACT

A method in one embodiment includes receiving, at an edge device, new data for training a model, the edge device having stored distilled data used to represent historical data to train the model, the historical data being stored in a remote device, and the amount of the historical data being greater than the amount of the distilled data. The method further includes training the model based on the new data and the distilled data. With the data processing solution of this embodiment, the model can be trained at the edge device with fewer storage resources based on the distilled data, thereby achieving higher model accuracy.

20 Claims, 6 Drawing Sheets

(56) References Cited

OTHER PUBLICATIONS

Y. Lecun et al., "GradientBased Learning Applied to Document Recognition," Proceedings of the IEEE, vol. 86, No. 11, Nov. 1998, pp. 2278-2324.
G. Hinton et al., "Distilling the Knowledge in a Neural Network," arXiv:1503.02531v1, Mar. 9, 2015, 9 pages.
E. Strubell et al., "Energy and Policy Considerations for Deep Learning in NLP," arXiv:1906.02243v1, Jun. 5, 2019, 6 pages.
I. Radosavovic et al., "Data Distillation: Towards Omni-Supervised Learning," IEEE/CVF Conference on Computer Vision and Pattern Recognition, Jun. 18-23, 2018, 10 pages.
U.S. Appl. No. 17/318,568 filed in the name of Zijia Wang et al. filed May 12, 2021, and entitled "Method, Electronic Device, and Computer Program for Data Distillation."
Wikipedia, "Knowledge Distillation," https://en.wikipedia.org/wiki/Knowledge_distillation, Mar. 30, 2021, 3 pages.

\* cited by examiner

METHOD, ELECTRONIC DEVICE, AND COMPUTER PROGRAM PRODUCT FOR DATA PROCESSING

RELATED APPLICATION(S)

The present application claims priority to Chinese Patent Application No. 202111235817.3, filed Oct. 22, 2021, and entitled "Method, Electronic Device, and Computer Program Product for Data Processing," which is incorporated by reference herein in its entirety.

FIELD

Embodiments of the present disclosure relate to the field of data processing, and in particular, to a method, an electronic device, and a computer program product for data processing.

BACKGROUND

Artificial intelligence industries such as autonomous driving rely on mass data. Terminal devices such as autonomous cars generate large amounts of data every day. These data can be used to train machine learning models to implement various artificial intelligence applications. These data also need to be stored for auditing and checking. However, storage of mass data requires a large amount of storage resources. Therefore, a method that can efficiently store training data used to train machine learning models is needed to reduce resource consumption.

SUMMARY

In a first aspect of the present disclosure, a method for data processing is provided. The method includes receiving, at an edge device, new data for training a model, the edge device having stored distilled data used to represent historical data to train the model, the historical data being stored in a remote device, and the amount of the historical data being greater than the amount of the distilled data. The method further includes training the model based on the new data and the distilled data.

In some embodiments of the first aspect, training the model based on the new data and the distilled data includes: based on the new data, further training the model that has been trained based on the distilled data.

In some embodiments of the first aspect, the new data represents additional data collected after the historical data, the additional data is stored in the remote device, the amount of the additional data is greater than the amount of the new data; and the method further includes storing the new data.

In some embodiments of the first aspect, the new data is determined at the remote device based on the additional data by using a data distillation algorithm.

In some embodiments of the first aspect, the method further includes receiving additional distilled data used to represent the new data to train the model or other models; and storing the additional distilled data to expand the distilled data.

In some embodiments of the first aspect, the additional distilled data is determined at the remote device based on the new data by using a data distillation algorithm.

In some embodiments of the first aspect, the distilled data is determined at the remote device based on the historical data by using a data distillation algorithm.

In a second aspect of the present disclosure, an electronic device is provided. The electronic device includes a processor and a memory coupled to the processor, the memory having instructions stored therein which, when executed by the processor, cause the device to execute actions. The actions include receiving, at an edge device, new data for training a model, the edge device having stored distilled data used to represent historical data to train the model, the historical data being stored in a remote device, and the amount of the historical data being greater than the amount of the distilled data. The actions further include training the model based on the new data and the distilled data.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

In the embodiments of the present disclosure, with the data processing solution of the present application, a model can be trained at an edge device with fewer storage resources based on distilled data, thereby achieving higher model accuracy.

This Summary is provided to introduce the selection of concepts in a simplified form, which will be further described in the Detailed Description below. The Summary is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent from the following description of example embodiments of the present disclosure, in combination with the accompanying drawings. In the example embodiments of the present disclosure, the same reference numerals generally represent the same parts.

DETAILED DESCRIPTION

Figure 1:
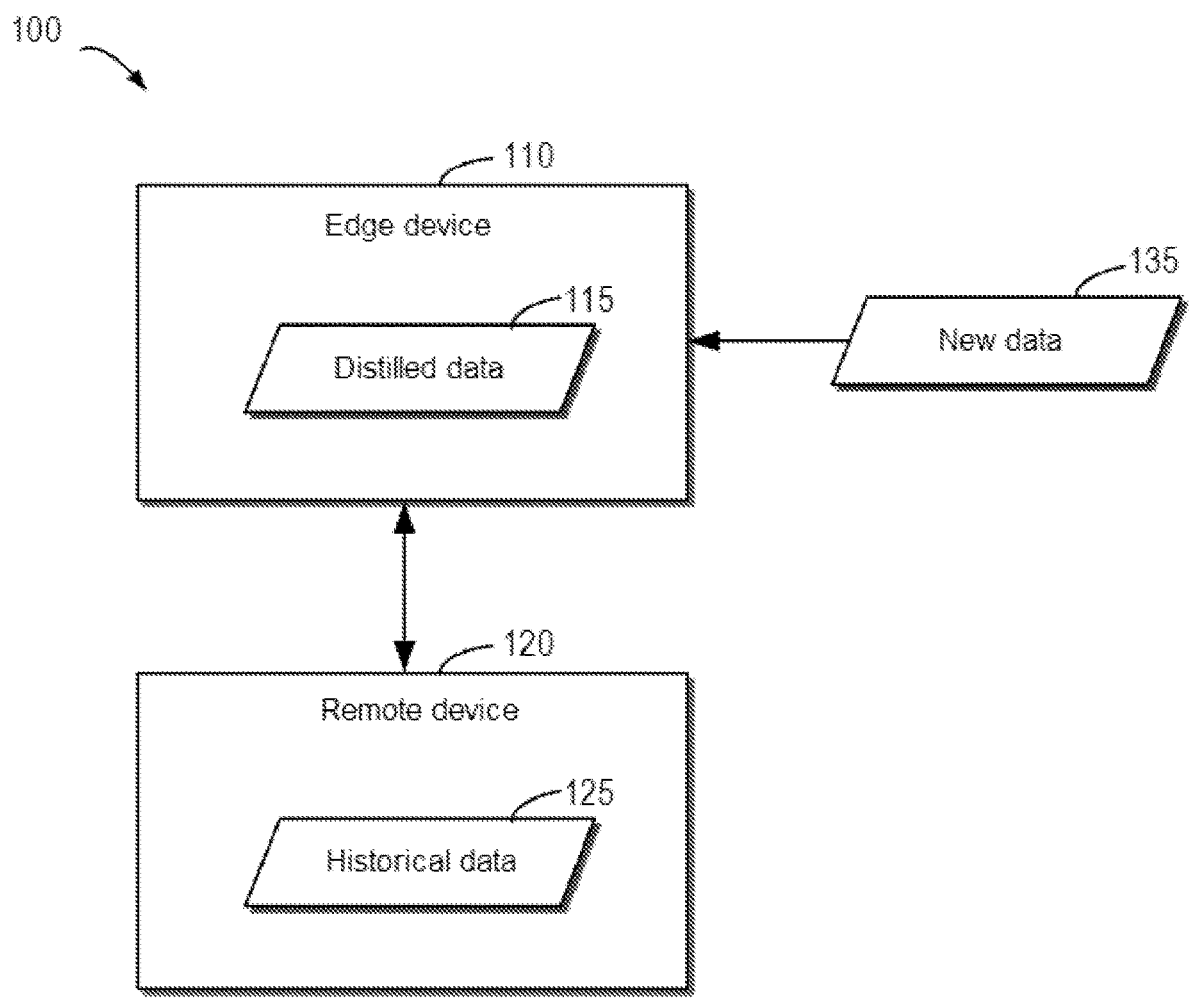
FIG. 1 shows a schematic diagram of an environment in which embodiments of the present disclosure can be implemented.

The principles of the embodiments of the present disclosure will be described below with reference to several example embodiments shown in the accompanying drawings. Although example embodiments of the present disclosure are illustrated in the accompanying drawings, it should be understood that these embodiments are described only to enable those skilled in the art to better understand and then implement the embodiments of the present disclosure, and not to limit the scope of the present disclosure in any way.

The term "include" and variants thereof used herein indicate open-ended inclusion, that is, "including but not limited to." Unless otherwise stated, the term "or" means "and/or." The term "based on" denotes "at least partially based on." The terms "an example embodiment" and "some embodiments" mean "at least one example embodiment." The term "another embodiment" means "at least one further embodiment." The terms "first," "second," and the like may refer to different or the same objects. Other explicit and implicit definitions may also be included below.

As mentioned above, a method that can efficiently store data used to train a machine learning model (such data hereinafter also referred to as training data) is needed. Since the amount of data generated by a terminal device is large, the generated data is usually stored in a server and used to train a machine learning model at the server. The server can push the trained machine learning model to the terminal device for the terminal device to use the trained model for inference. Alternatively, the server may push an inference result to the terminal device.

In some conventional solutions, mass data can be stored in a remote device, such as a data center or a cloud server. These data can be stored at the remote device for a very long time (for example, ten years) at a low cost to comply with regulatory requirements, such as laws and regulations. An edge device can obtain the trained model from the remote device, and inference can be performed at the edge device by using the model. The edge device may send the inference result to the terminal device for use by the terminal device.

In other solutions, the edge device may store a part of training data for further training the trained model obtained from the remote device. For example, the edge device can store a part of the newly collected training data for use in updating the model. In this way, the edge device can quickly update the model and use the updated model to perform inference. However, due to the limited computing power and storage capacity of the edge device, the edge device can only use a small amount of data to train a model, and as a result it may be difficult for the accuracy of the trained model to meet requirements.

Illustrative embodiments of the present disclosure provide a solution for data processing. In this solution, new data used to train a model is received at an edge device, the edge device has stored distilled data used to represent historical data to train the model, the historical data is stored in a remote device, and the amount of the historical data is greater than the amount of the distilled data. The method further includes training the model based on the new data and the distilled data.

In this way, distilled data that can represent a large amount of historical data to train a model is stored at an edge device, so that the model can be trained at the edge device with fewer storage resources by using the distilled data, while the accuracy of the trained model can meet requirements.

The basic principles and several example embodiments of the present disclosure are described below with reference to FIGS. 1 to 5. It should be understood that these example embodiments are given only to enable those skilled in the art to better understand and thus implement the embodiments of the present disclosure, and not to limit the scope of the present disclosure in any way.

FIG. 1 shows environment 100 in which embodiments of the present disclosure can be implemented. As shown in FIG. 1, environment 100 includes edge device 110 and remote device 120. There is a communication connection between edge device 110 and remote device 120.

Edge device 110 and remote device 120 may be any computing device in the form of general-purpose computing devices. Components of edge device 110 and remote device 120 may include, but are not limited to, one or more processors or processing units, memories, storage devices, one or more communication units, one or more input devices, and one or more output devices. These components may be integrated on a single device or provided in the form of a cloud computing architecture.

In some embodiments, remote device 120 may be a cloud server. Remote device 120 may provide services via a wide area network (e.g., the Internet) with appropriate protocols. For example, a cloud computing provider provides applications through a wide area network, and they are accessible through a web browser or any other computing components. Alternatively, remote device 120 may also be a conventional server. In some embodiments, edge device 110 (also referred to as an edge node) may be associated with a base station of a network service provider. For example, edge device 110 may be deployed on a base station side.

Remote device 120 may store historical data 125 collected from a terminal device (not shown). Examples of the terminal device include an autonomous car, a smart phone, a tablet computer, a smart home, and the like. For example, a sensor in an autonomous car can generate a large amount of data, and these data can be stored in remote device 120 as historical data 125. Depending on predetermined rules, historical data 125 needs to be stored in remote device 120 for a predetermined period of time.

Edge device 110 may store distilled data 115 used to represent historical data 125 to train a model. The amount of distilled data 115 is less than the amount of historical data 125. Distilled data 115 may be determined based on part or all of historical data 125 by using a data distillation algorithm. Distilled data 115 may represent historical data 125 to train a model, so that a small amount of training data can be used to achieve high model accuracy. Various data distillation algorithms can be used to determine distilled data 115 based on historical data 125. The scope of the present disclosure is not limited herein.

Edge device 110 may receive new data 135 to further train the model, that is, to update the model. Edge device 110 may communicate with the terminal device to quickly obtain recently collected new data 135 from the terminal device. Alternatively or additionally, edge device 110 may receive new data 135 from remote device 120. For example, new data 135 collected from the terminal device may first be sent to remote device 120 for long-term storage. Remote device 120 can then send new data 135 to edge device 110 for use in training the model.

It should be understood that environment 100 shown in FIG. 1 is merely an example and should not constitute any limitation to the functions and scope of the implementations described in the present disclosure. For example, environment 100 may also include a data center. The data center can receive data from the terminal device and send it to remote device 120 or edge device 110.

Figure 2:
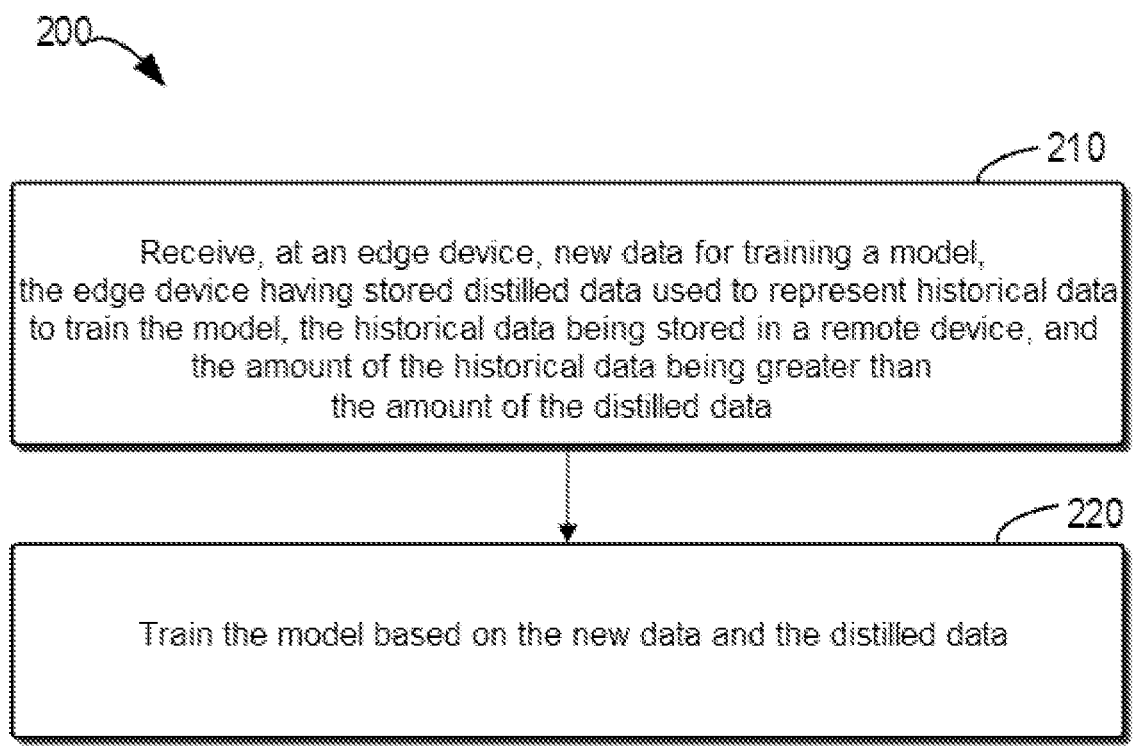
FIG. 2 shows a flow chart of an example method for data processing according to some embodiments of the present disclosure.

FIG. 2 shows a flow chart of example method 200 for data processing according to some embodiments of the present disclosure. Method 200 can be implemented, for example, in environment 100 as shown in FIG. 1. Method 200 can be implemented, for example, at edge device 110 as shown in FIG. 1. It should be understood that method 200 may also include additional actions not shown and/or may omit actions shown, and the scope of the present disclosure is not limited in this regard.

At block 210, new data 135 used to train a model is received at edge device 110, edge device 110 has stored distilled data 115 used to represent historical data 125 to train the model, historical data 125 is stored in remote device 120, and the amount of historical data 125 is greater than the amount of distilled data 115. New data 135 may be original data recently received from the terminal device or remote device 120. Alternatively, new data 135 may also be distilled data determined based on the recently received original data. Hereinafter, a process of using new data 135 to update data stored in edge device 110 and remote device 120 will be described with reference to FIG. 3.

Figure 3:
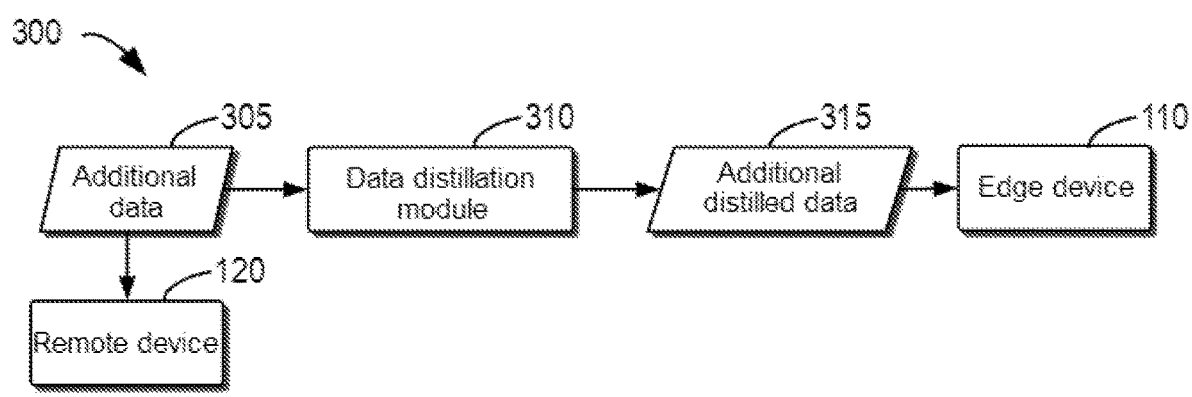
FIG. 3 shows a schematic diagram of a process of updating data storage by using new data according to some embodiments of the present disclosure.

FIG. 3 shows schematic diagram 300 of a process of updating data storage by using new data 135 according to some embodiments of the present disclosure. New data 135 may be additional data 305 that has not been distilled. Alternatively, new data 135 may be additional distilled data 315 that has been distilled. Additional data 305 may be supplementary data that is used to train a model and is different from historical data 125 or distilled data 115. Additional data 305 may be data collected from the terminal device after historical data 125.

As shown in FIG. 3, additional data 305 may be input to data distillation module 310. Data distillation module 310 may use various data distillation algorithms to determine additional distilled data 315 based on additional data 305. Additional distilled data 315 may represent additional data 305 to train the model, and the amount of additional distilled data 315 is less than the amount of additional data 305. The scope of the present disclosure is not limited in terms of the data distillation algorithms.

In some embodiments, additional data 305 with a large volume may be stored in remote device 120. In this way, newly received additional data 305 can be stored in remote device 120 for a predetermined period of time at a low cost.

Additional distilled data 315 with a small volume may be stored in edge device 110. Additional distilled data 315 can be used to expand distilled data 115 stored in edge device 110. The expanded distilled data can be used to update the trained model or train a new model. In this way, the distilled data can be used to train the model at edge device 110 with fewer storage resources, thereby achieving high model accuracy.

In some embodiments, data distillation module 310 may be implemented at remote device 120. Alternatively or additionally, data distillation module 310 may be implemented at edge device 110. Alternatively or additionally, data distillation module 310 may be implemented at other suitable servers.

Referring again to FIG. 2, at block 220, the model is trained at edge device 110 based on new data 135 and distilled data 115. In some embodiments, before receiving new data 135, edge device 110 has already stored a model trained based on distilled data 115. In this case, edge device 110 may further train the model based on received new data 135. Hereinafter, a process of further training a model based on new data 135 will be described with reference to FIG. 4.

Figure 4:
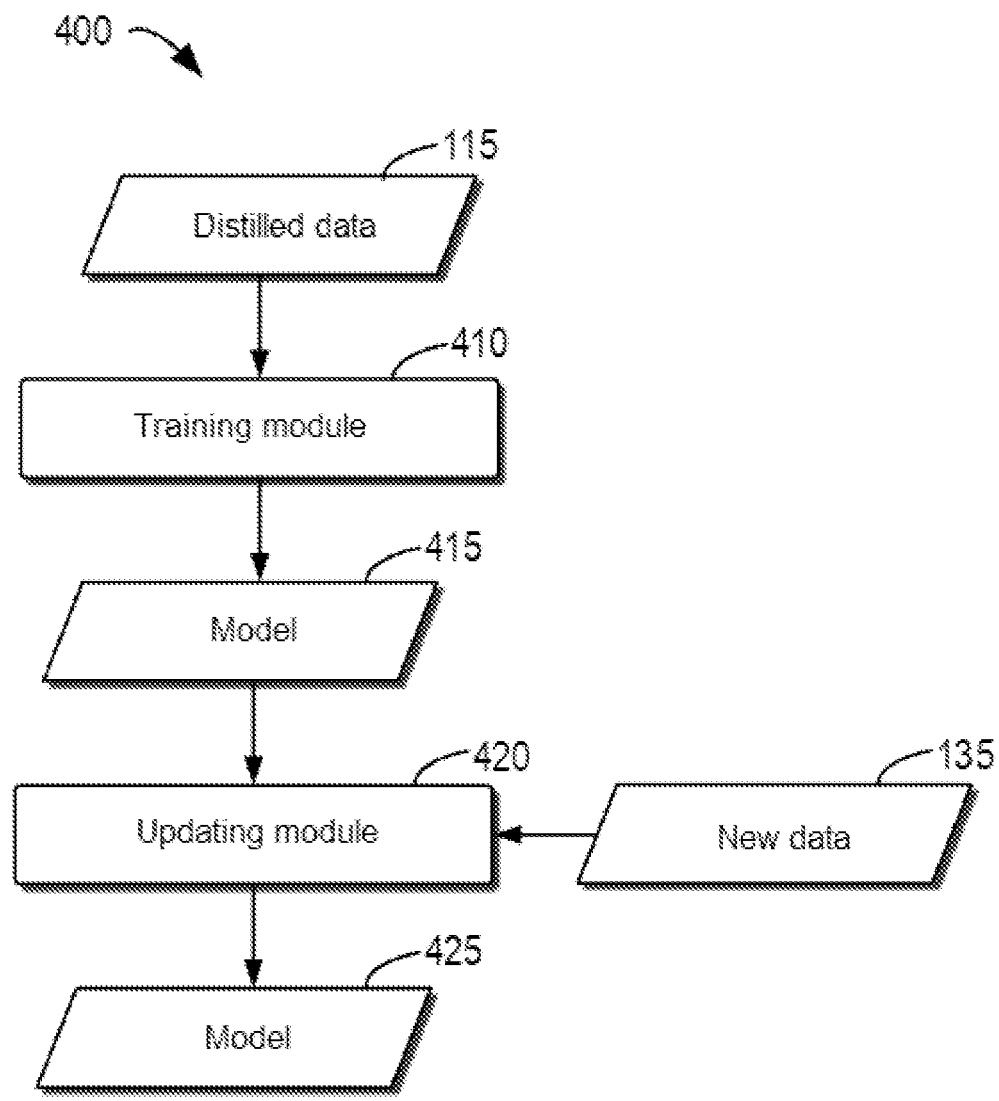
FIG. 4 shows a schematic diagram of a first process of training a model according to some embodiments of the present disclosure.

FIG. 4 shows a schematic diagram of first process 400 of training a model according to some embodiments of the present disclosure. As shown in FIG. 4, at edge device 110, training module 410 may train a model based on distilled data 115 and output trained model 415. Edge device 110 may use trained model 415 to perform inference. After receiving new data 135, updating module 420 may further train model 415 based on the new data and output updated model 425. Training module 410 and updating module 420 may be implemented by the same or different modules.

Alternatively or additionally, model 415 may be further trained based on both new data 135 and stored distilled data 115. Alternatively or additionally, in the case where new data 135 is additional distilled data 315 that has been distilled, distillation information of new data 135 may be used to assist the training of model 415. In this way, new data 135 can be used to train the model at edge device 110 with fewer storage resources, while high model accuracy can be achieved.

Figure 5:
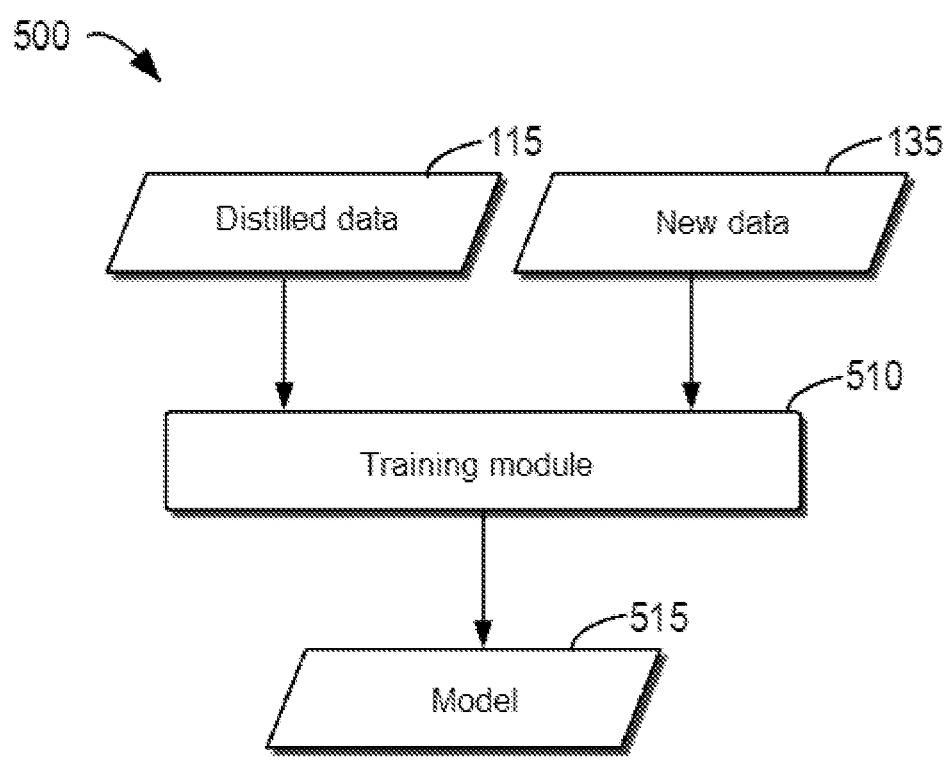
FIG. 5 shows a schematic diagram of a second process of training a model according to some embodiments of the present disclosure.

FIG. 5 shows a schematic diagram of second process 500 of training a model according to some embodiments of the present disclosure. As shown in FIG. 5, at edge device 110, after receiving new data 135, training module 510 may train a new model based on distilled data 115 and new data 135, and output trained model 515. Edge device 110 may use trained model 515 to perform inference. In this way, new data 135 and distilled data 115 can be used to train the model at edge device 110 with fewer storage resources, while high model accuracy can be achieved.

In some embodiments, in the case where new data 135 is additional data 305 that has not been distilled, after training or updating the model based on new data 135, edge device 110 may discard new data 135. Conversely, edge device 110 may store additional distilled data 315 for further training of the model or training of a new model.

In some embodiments, in the case where new data 135 is additional distilled data 315 that has been distilled, after training or updating the model based on new data 135, edge device 110 may store new data 135 for further training of the model or training of a new model.

In conventional solutions, an edge device can only use a small amount of raw data to train a model since it has fewer storage resources. Since the amount of training data is small, the accuracy of the trained model is difficult to meet requirements. Compared with conventional solutions, distilled data 115 having a small volume can represent historical data 125 with a large volume to train a model, and therefore, the model can be trained at the edge device based on distilled data 115 to achieve a high model accuracy.

The method for data processing according to the embodiments of the present disclosure has been described above with reference to FIG. 2 to FIG. 5. According to the embodiments of the present disclosure, a tiered storage system is also provided. The system may include a hot data storage module and a cold data storage module. The hot data storage module may be implemented at edge device 110 for storing distilled data 115 used to train a model. The cold data storage module may be implemented at remote device 120 for storing historical data 125. Compared with the hot data storage module, the cold data storage module is featured by large storage capacity and low price. Therefore, the cold data storage module can be used for long-term storage of training data, while the hot data storage module can store distilled training data with a smaller volume. By the tiered storage system, the efficiency of storing and utilizing training data can be improved.

Figure 6:
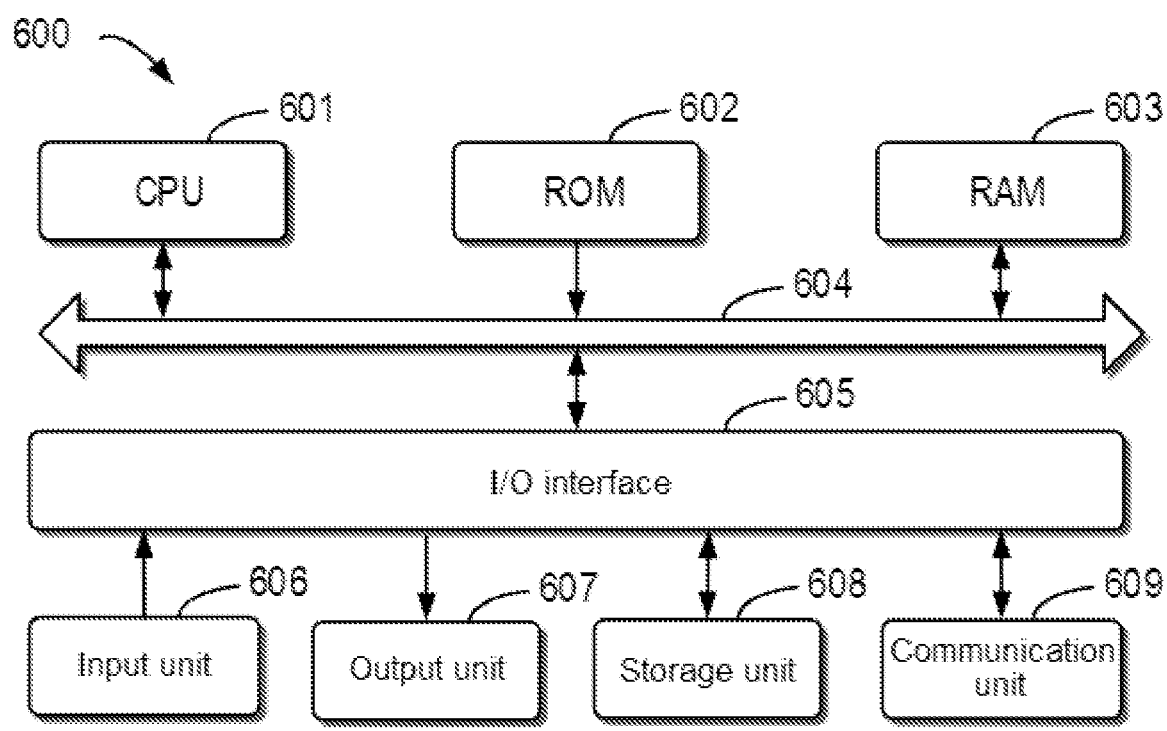
FIG. 6 shows a block diagram of an example computing device that can be used to implement embodiments of the present disclosure.

FIG. 6 shows a schematic block diagram of example device 600 that can be used to implement the embodiments of the present disclosure. For example, device 600 can be implemented at environment 100 as shown in FIG. 1. Device 600 can be implemented as edge device 110 or remote device 120 shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

Example embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for data processing, comprising:
   receiving, at an edge device, new data for training a model, the edge device having stored distilled data used to represent historical data to train the model, the historical data being stored in a remote device, and the amount of the historical data being greater than the amount of the distilled data; and
   training the model based on the new data and the distilled data.

2. The method according to claim 1, wherein training the model based on the new data and the distilled data comprises:
   based on the new data, further training the model that has been trained based on the distilled data.

3. The method according to claim 1, wherein the new data represents additional data collected after the historical data, the additional data is stored in the remote device, the amount of the additional data is greater than the amount of the new data, and the method further comprises storing the new data.

4. The method according to claim 3, wherein the new data is determined at the remote device based on the additional data by using a data distillation algorithm.

5. The method according to claim 1, further comprising:
   receiving additional distilled data used to represent the new data to train the model or other models; and
   storing the additional distilled data to expand the distilled data.

6. The method according to claim 5, wherein the additional distilled data is determined at the remote device based on the new data by using a data distillation algorithm.

7. The method according to claim 1, wherein the distilled data is determined at the remote device based on the historical data by using a data distillation algorithm.

8. An electronic device, comprising:
   a processor; and
   a memory coupled to the processor, wherein the memory has instructions stored therein, and the instructions, when executed by the processor, cause the device to execute actions comprising:
   receiving, at an edge device, new data for training a model, the edge device having stored distilled data used to represent historical data to train the model, the historical data being stored in a remote device, and the amount of the historical data being greater than the amount of the distilled data; and
   training the model based on the new data and the distilled data.

9. The device according to claim 8, wherein training the model based on the new data and the distilled data comprises:
   based on the new data, further training the model that has been trained based on the distilled data.

10. The device according to claim 8, wherein the new data represents additional data collected after the historical data, the additional data is stored in the remote device, the amount of the additional data is greater than the amount of the new data, and the actions further comprise storing the new data.

11. The device according to claim 10, wherein the new data is determined at the remote device based on the additional data by using a data distillation algorithm.

12. The electronic device according to claim 8, wherein the actions further comprise:
   receiving additional distilled data used to represent the new data to train the model or other models; and
   storing the additional distilled data to expand the distilled data.

13. The device according to claim 12, wherein the additional distilled data is determined at the remote device based on the new data by using a data distillation algorithm.

14. The device according to claim 8, wherein the distilled data is determined at the remote device based on the historical data by using a data distillation algorithm.

15. A computer program product that is tangibly stored on a non-transitory computer-readable medium and comprises machine-executable instructions, wherein the machine-executable instructions, when executed, cause a machine to perform a method for data processing, the method comprising:
   receiving, at an edge device, new data for training a model, the edge device having stored distilled data used to represent historical data to train the model, the historical data being stored in a remote device, and the amount of the historical data being greater than the amount of the distilled data; and
   training the model based on the new data and the distilled data.

16. The computer program product according to claim 15, wherein training the model based on the new data and the distilled data comprises:
   based on the new data, further training the model that has been trained based on the distilled data.

17. The computer program product according to claim 15, wherein the new data represents additional data collected after the historical data, the additional data is stored in the remote device, the amount of the additional data is greater than the amount of the new data, and the method further comprises storing the new data.

18. The computer program product according to claim 17, wherein the new data is determined at the remote device based on the additional data by using a data distillation algorithm.

19. The computer program product according to claim 15, further comprising:
   receiving additional distilled data used to represent the new data to train the model or other models; and
   storing the additional distilled data to expand the distilled data.

20. The computer program product according to claim 19, wherein the additional distilled data is determined at the remote device based on the new data by using a data distillation algorithm.

* * * * *